No. 690,192. Patented Dec. 31, 1901.
G. H. F. SCHRADER.
TIRE OR OTHER VALVE.
(Application filed Feb. 14, 1898.)
(No Model.)
FIG. 1.
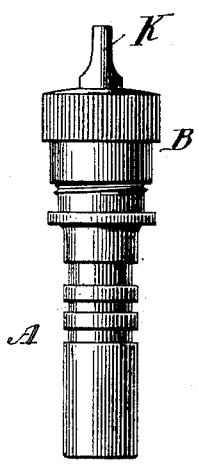
FIG. 2.
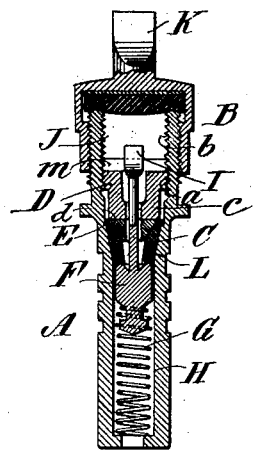
FIG. 3.
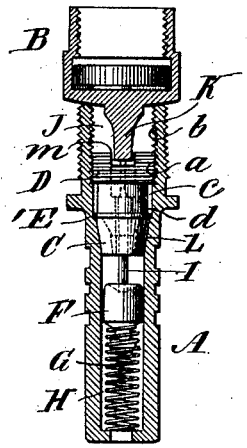
FIG. 4.
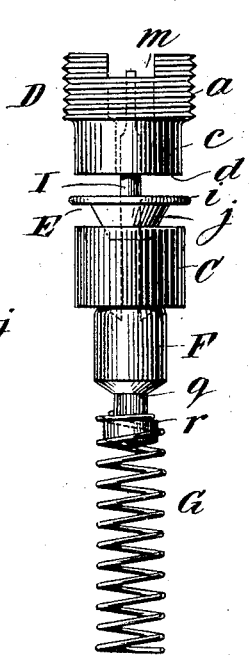
FIG. 5.
FIG. 7.
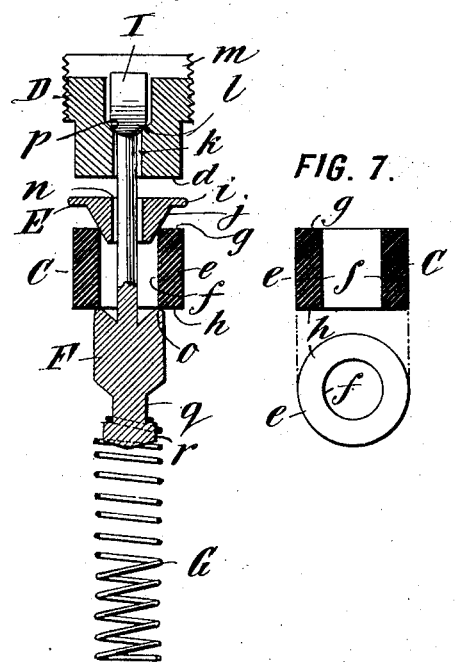
FIG. 6.
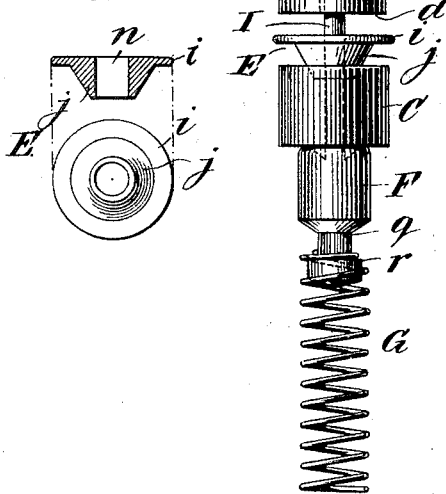
WITNESSES:
Fred White
Thomas S. Wallace
INVENTOR:
George H. F. Schrader,
By his Attorneys,
Arthur C. Fraser & Co

UNITED STATES PATENT OFFICE.

GEORGE H. F. SCHRADER, OF NEW YORK, N. Y.

TIRE OR OTHER VALVE.

SPECIFICATION forming part of Letters Patent No. 690,192, dated December 31, 1901.

Application filed February 14, 1898. Serial No. 670,180. (No model.)

*To all whom it may concern:*

Be it known that I, GEORGE H. F. SCHRADER, a citizen of the United States, residing in the city, county, and State of New York, have invented certain new and useful Improvements in Tire or other Valves, of which the following is a specification.

This invention relates to air and other valves for pneumatic tires and other devices, and aims to provide certain improvements therein.

The invention relates especially to valves of the class heretofore invented in which a tube of packing material used as a seat member is held in position in a valve-shell by a plug screwed into the latter, the valve proper seating against the end of the tube and the valve-stem or deflating-pin traversing the tube and plug and inseparably coupled thereto in the usual form of my said construction. In such valves the tube has been compressed against the shell by the plug to make a tight joint, in doing which the rotation of the plug has been liable to injure or distort the tube.

My present invention aims to provide a valve of this general character in which there need be no rotative distortion of the rubber seat tube.

To this end in carrying out the preferred form of my present improvements I provide a tubular rubber seat member and a plug for screwing into a valve-shell to hold the seat member therein, the parts being rotative independently of each other, so that the seat member can be inserted or removed with the plug without distortion or injury due to rotation of the latter, and I provide an antifriction-piece between the plug and seat member, means for wedging the outer end of the plug against the valve-shell to insure a tight joint, and certain other features of improvement, all of which will be hereinafter fully set forth.

In the accompanying drawings, which show the preferred form of my invention, Figure 1 is a side elevation of a tire-valve. Fig. 2 is an axial section thereof, the parts being in the closed position. Fig. 3 is a similar view looking at right angles, the internal parts being in elevation and in the open position and the cap being inverted for deflating the valve. Fig. 4 is an enlarged elevation of my improved seat member, plug, spreader, valve proper, and spring removed and connected together in condition for sale and use as an attachment to a valve-shell. Fig. 5 is an axial section thereof looking at right angles to Fig. 4. Fig. 6 is an axial section and bottom plan view of the spreader, and Fig. 7 is an axial section and end view of the seat member.

Referring to the drawings, let A indicate a valve-shell; B, the cap thereof; C, the seat member; D, the plug; E, an antifriction washer and spreader between these parts; F, the valve proper; G, a spring therefor; H, the valve-chamber; I, the valve or deflating stem; J, the socket for the plug; K, the deflating-finger on the cap, and L a face or shoulder within the valve-shell, against which the seat member rests. These parts may be of any suitable construction and operation; but according to the preferred form of my invention the seat member and plug are rotatively connected together, and the holder E is interposed between them. In this form the plug is externally screw-threaded at $a$ for engaging the internal screw-thread $b$ of the socket J, is plain or cylindrical and of reduced diameter at its inner end at $c$, and terminates in an abrupt face $d$ at its lower or inner end. The seat member is a plain rubber tube having cylindrical outer wall $e$ and inner wall $f$, square top end $g$, and square bottom end $h$, and the holder E is a flat-topped disk having a projecting flange $i$ at its upper edge and a tapering or conical inwardly-projecting spreader $j$ inwardly of and below this flange. The plug is traversed by a conduit $k$, having an internal shoulder $l$, and is crossed at its upper end by a screw-driver notch $m$. The holder is traversed by a conduit $n$, the conduits $k\,n$ and the hollow interior of the rubber tube constituting the inlet-duct through the valve, while the inner end $h$ of the tube constitutes the valve-seat.

The valve proper and stem are preferably formed of a single integral piece of metal, the valve proper having an annular edge $o$, engaging the seat $h$, and the stem having a shoulder $p$, engaging the shoulder $l$, so that the parts are movably but inseparably connected together. The end of the stem I projects into or through the notch $m$, so that it may be depressed to unseat the valve by inserting the finger K into the notch. The plug screws entirely into the socket J and is screwed into and out of the latter by means of the finger K or other suitable tool.

The valve proper is shown as formed with a groove $q$ and head $r$, to which the spring G is loosely but inseparably coupled.

The recess in A is of less internal diameter at the chamber H than at the socket J, and the face or shoulder L leads from one to the other, preferably as a tapering wall. The outer face $e$ of the tube C fits against this wall and is forced at its upper end tightly thereagainst by the cone $j$ of the holder E, being at the same time prevented from upward distortion by the flange $i$ of this holder, which flange is of sufficient diameter to engage the wall L and prevent further inward movement of the plug and holder at such a point that a tight joint between the seat member and wall will be assured. The tapers of the wall L and of the cone $j$ are divergent, so that the space between them converges outwardly toward the flange $i$, thus providing a confined space into which the seat member is compressed by egress-pressure in the valve, so that the greater this pressure the tighter will be the joint.

The holder E and plug D at their adjacent faces are smooth, so that the former acts as an antifriction washer or protector between the plug and seat member, thus relieving the latter of practically all rotative tendency during screwing in or out of the plug.

The plug-holder and seat member, with or without the valve proper or a deflating-stem, constitute a new article of manufacture applicable to any suitable valve-shell. They can be applied thereto or removed therefrom by simply screwing the plug into or out of the socket J of said shell.

In use the valve will be operated as ordinarily for tire-valves of this general class. Air will be pumped in, unseating the valve with the inflow. The internal pressure and the spring will seat the valve against escape of air. The cap will be inverted and its finger engaged with the notch $m$ for rotating the plug to screw it in or out for adjustment or removal of the valve, and the finger will be simply pressed against the stem for deflation of the valve. In case of impairment of the rubber seat member with age the attachment will be removed, the seat member torn off, and a new one sprung over the valve proper into the place before occupied by the old one, whereupon the parts can be replaced in the shell and the valve will again be effective in operation.

It will be seen that my invention provides improvements which can be readily and advantageously availed of, and it will be understood that I do not limit myself to the particular details of construction, arrangement, and operation set forth as constituting the preferred form of my invention, since these can be modified as circumstances or the judgment of those skilled in the art may dictate without departing from the spirit of the invention.

What I claim is—

1. In tire and other valves, a valve-shell having a valve-chamber and a screw-threaded socket, in combination with a tubular plug screwing into said socket, and a seat member of packing material out of contact with said plug and forced by said plug into engagement with the interior of such shell, and a member interposed between said plug and seat member, said plug and seat member independently rotative the one relatively to the other, and a valve proper for engaging said seat member.

2. In tire and other valves, a shell having a valve-chamber and a screw-threaded socket, in combination with a plug screwing in said socket, a seat member held in said shell by said plug, and an antifriction member between said plug and seat member and permitting rotation of the plug independently of the latter, and a valve proper in said chamber.

3. In tire and other valves, a valve-shell having an inner valve-chamber and an outer screw-thread, in combination with a tubular seat member of packing material within said shell, a tapering spreader entering said seat member and distorting it outwardly against said shell, and a plug screwing on said thread rotative relatively to said spreader and forcing the latter in said shell, and a valve proper in said chamber.

4. In tire and other valves, a shell having a chamber H, screw-threaded socket J and intermediate wall L, and a valve proper in said chamber, in combination with a plug D screwing in said socket, a seat member L engaging said wall, and a holder E between said plug and seat member, holding the latter in place and distorting it against said wall.

5. For tire and other valves, the improved attachment comprising a screw-threaded tubular plug, a tube of packing material rotative relative thereto, and an antifriction-disk between said plug and tube, and means connecting said parts together.

6. For tire and other valves, the improved attachment comprising a tubular screw-threaded plug, a tube of packing material rotative relatively thereto, a member between said plug and tube, and a stem connecting said parts together.

In witness whereof I have hereunto signed my name in the presence of two subscribing witnesses.

GEORGE H. F. SCHRADER.

Witnesses:
  GEORGE H. FRASER,
  THOMAS F. WALLACE.